United States Patent
Weber et al.

(10) Patent No.: US 6,614,750 B2
(45) Date of Patent: Sep. 2, 2003

(54) OPTICAL RECORDABLE DISK SECURITY SYSTEM

(76) Inventors: Warren Weber, 15718-53rd Pl. W., Edmonds, WA (US) 98026; Kevin S. Davis, 2019-237th Pl. SE, Bothell, WA (US) 98021

( * ) Notice: Subject to any disclaimer, the term of this patent is extended or adjusted under 35 U.S.C. 154(b) by 186 days.

(21) Appl. No.: 09/796,667

(22) Filed: Feb. 28, 2001

(65) Prior Publication Data

US 2002/0118633 A1 Aug. 29, 2002

(51) Int. Cl.[7] .................... G11B 7/24; B65D 85/57; G08B 13/14
(52) U.S. Cl. .................. 369/290; 206/308.2; 340/572.1; 340/572.8
(58) Field of Search ............... 369/290; 360/135; 206/308.2; 340/572.1, 572.8, 572.9; 380/201

(56) References Cited

U.S. PATENT DOCUMENTS

| | | | |
|---|---|---|---|
| 4,139,844 A | 2/1979 | Reeder .................. 340/572 |
| 4,642,640 A | 2/1987 | Woolsey et al. ............ 342/42 |
| 4,709,813 A | * 12/1987 | Wildt .................. 206/308.2 |
| 4,794,470 A | 12/1988 | Lauffenburger et al. ...... 360/69 |
| 4,910,625 A | * 3/1990 | Albrecht et al. ............ 360/135 |
| 4,967,184 A | * 10/1990 | Regelsberger ........... 340/572.8 |
| 5,012,380 A | * 4/1991 | Harissis et al. ............. 360/135 |
| 5,347,508 A | 9/1994 | Montbriand et al. ........ 369/273 |
| 5,528,223 A | 6/1996 | DiLonardo et al. ......... 340/572 |
| 5,699,047 A | 12/1997 | Tsai et al. .................... 340/572 |
| 5,825,292 A | 10/1998 | Tsai et al. .................... 340/572 |
| 5,939,985 A | * 8/1999 | Tsai et al. ................. 340/572.1 |
| 6,097,291 A | * 8/2000 | Tsai et al. ................. 340/572.6 |
| 6,495,232 B2 | * 12/2002 | Weber ........................ 428/64.1 |
| 2002/0136404 A1 | * 9/2002 | Weber ........................ 380/201 |
| 2002/0140556 A1 | * 10/2002 | Tsai ........................ 340/572.1 |

FOREIGN PATENT DOCUMENTS

| EP | 809245 A2 | * 11/1997 | .......... G11B/20/00 |
| EP | 849734 A2 | * 6/1998 | .......... G11B/20/00 |

* cited by examiner

*Primary Examiner*—William Klimowicz
(74) *Attorney, Agent, or Firm*—Dean A. Craine

(57) ABSTRACT

A multimedia disk security system which uses a removable center plug that fits into the central hole formed on the disk body. Attached or formed inside the center plug is a EAS tag, the presence or absence of which is detectable to a standard electronic article surveillance detector. In one embodiment, an optional main label may be attached over the entire disk body to hide the EAS tag.

8 Claims, 1 Drawing Sheet

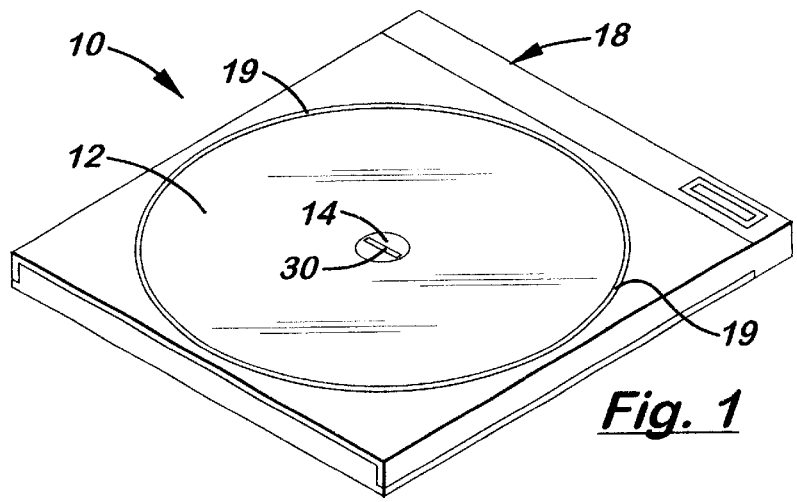
Fig. 1
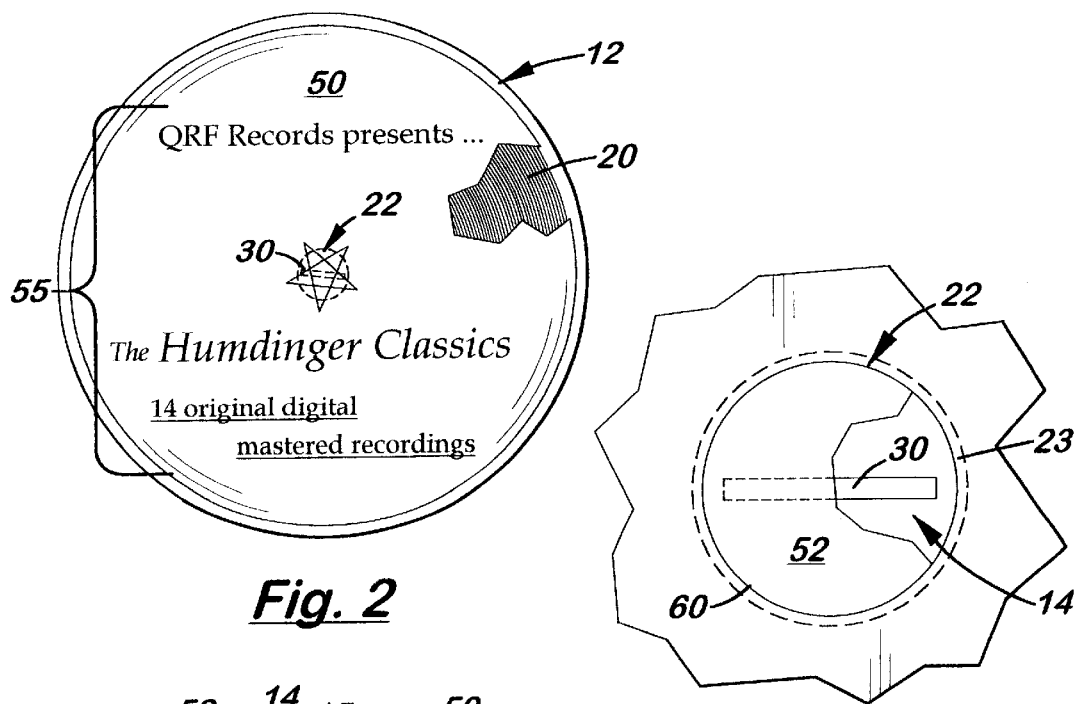
Fig. 2
Fig. 3
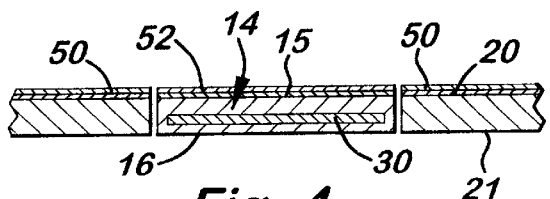
Fig. 4
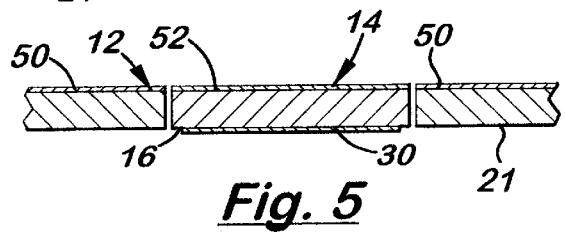
Fig. 5 ously filed U.S. patent application, (Ser.

OPTICAL RECORDABLE DISK SECURITY SYSTEM

BACKGROUND OF THE INVENTION

1. Field of the Invention

This invention generally relates to retail theft security systems, and more particularly to security systems for optical recordable disks, such as compact disks (CD's) and digital video disks (DVD's).

2. Description of the Related Art

Optical recordable disks, such as CD's and DVD's, which are available with a removable center plug, are disclosed in the inventors' previously filed U.S. patent application, (Ser. No. 09/564,454, filed on May 3, 2000), now U.S. Pat. No. 6,495,232 B2. As discussed in this document, placing a removable plug in the center hole on the disk is useful because it provides a support surface for attaching a label or for printing a complete image over the entire top visible surface of the disk.

Retail theft of optical recordable disks is a major problem for retailers. Heretofore, surveillance devices, such as electronic article surveillance (EAS) tags, imbedded or attached to their protective outer containers or to clips attached to their outer containers, are widely known. Descriptions of these systems are found in U.S. Pat. Nos. 4,139,844 and 4,642,640. The presence or absence of an EAS tag is monitored by a detector which transmits an audible alarm when the outer container is passed there through to indicate that a shoplifting event is taking place.

Many portable, reusable recordable mediums, such as video cassette recorder (VCR) tapes, digital video (DV) tapes, floppy disks, and video game cartridges, store their recordable media inside a sealed outer container. Security systems for these types of outer containers that use an EAS tag hidden inside are disclosed in U.S. Pat. Nos. 4,794,470 and 5,528,223. The main advantage of placing the EAS tag inside the sealed outer container is that they are invisible and can not be removed without destroying the outer container. When the outer container is destroyed, the recordable media can no longer be played in their respective players.

It is common practice to attach an EAS tag to the outer container of an optical recordable disk to prevent retail theft. Unfortunately, thieves are able to easily avoid detection by merely removing the EAS tag from the outer container. Recently, security systems have been developed that use an EAS RF-type or electro-magnetic-type tag directly attached to a surface on the optical recordable disk. (See U.S. Pat. Nos. 5,347,508, 5,699,047 and 5,825,292). One problem with such systems is that the EAS tags must be properly positioned on the optical recordable disk so that the disk is mechanically balanced when played. Another problem is that attachment of the EAS tag on the surface may interfere with the recordable media or with the graphic artwork or text printed on the top surface of the disk.

What is needed is an improved retail anti-theft system for optical recordable disks, that can be used with existing outer containers and existing EAS systems.

SUMMARY OF THE INVENTION

It is an object of the present invention to provide an improved retail anti-theft system for optical recordable disks.

It is another object of the present invention to provide such a system that can be used with current protective outer containers for the optical recordable disks.

It is a further object of the present invention to provide such a system that can be used with current electronic article surveillance systems commonly used in retail stores.

These and other objects of the invention are met by an optical recordable disk security system which uses a standard optical recordable disk body with a center hole formed therein and a removable center plug capable of being selectively disposed inside the center hole by the disk manufacturer or by the retailer. Disposed inside or attached to the outside of the center plug is an EAS tag capable of being detected by an EAS detector commonly used by retailers.

In one embodiment, the EAS tag is placed over the top surface of the center plug with a main label adhesively attached over the top surface of both the disk body and center plug. The center portion of the main label covers the EAS tag so that it is invisible to customers. The center portion of the main label is designed to be detachable from the outer portion of the main label so that the center plug, with the center portion attached thereto maybe easily removed from the disk body without destroying the center and outer portions of the main label. When the center plug is removed, the disk body can then be played in a standard player that uses a spindle to rotate the disk body. A broken perforation line that delineates the center and outer portions of the main label may be used to visually indicate whether the plug has been removed or tampered with.

In another embodiment, the EAS tag is manufactured inside the center plug itself.

In still another embodiment, the EAS tag is attached to an invisible surface on the center plug when the disk is stored in its outer container.

In the preferred embodiment, a suitable HAS tag is selected and attached to the center plug that snap fits into the center hole formed on the disk body by the manufacturer. The disk body is then sealed inside its protective outer container or sleeve. A second EAS tag may be attached to the outside surface of the outer container or sleeve. When the customer purchases the disk, the sealed outer container is passed through a standard deactivating device to deactivate both the inside and outside HAS tags. The sealed outer container can then be safely carried through the EAS detector without activating the alarm. If the optical recordable disk is returned to the retailer, the inside and outside EAS tags may be re-activated and sold to further customers.

In order to overcome the above-described security system, both the outside and inside EAS tags must be removed from the outer container and the center plug. Since the EAS tag is not visible when the disk body is stored in the outer container, the thief is unaware of its existence. Also, since the outer container is sealed and difficult to open, removal of the inside EAS tag from the center plug, if known, is discouraged. Also, by attaching or manufacturing the EAS tag to the center plug rather that directly to a surface on the disk body, the EAS tag can be easily removed from the disk body without damaging the recordable media, leaving an adhesive residue, or destroying or blocking the top printed surface on the disk body.

DESCRIPTION OF THE DRAWINGS

FIG. 1 is a perspective view of an optical recordable disk with art-removable center plug, an EAS tag attached to the top surface of the plug, all placed inside a protective outer container.

FIG. 2 is a top plan of the optical recordable disk shown in FIG. 1 removed from the outer container.

FIG. 3 is a partial top plan view of the optical recordable disk shown in FIGS. 1 & 2 showing the center plug with an EAS tag attached to its top surface.

FIG. 4 is a partial, sectional side elevational view of another embodiment of the optical recordable disk showing the EAS tag manufactured inside the center plug.

FIG. 5 is a partial, sectional side elevational view of another embodiment of the optical recordable disk showing the EAS tag attached to the bottom surface of the center plug.

DESCRIPTION OF THE PREFERRED EMBODIMENT(S)

The novel features believed to be characteristic of this invention are set forth in the appended claims. The invention itself, however, maybe best understood and its various objects and advantages best appreciated by reference to the detailed description below in connection with the accompanying drawings.

In the accompanying FIGS. 1–5, an optical recordable disk assembly 10 in accordance with the teachings of the present invention, is illustrated that includes a flat, circular disk body 12 with a removable center plug 14 disposed inside the center cutout 22. When assembled, the disk body 12 and the center plug 14 are distributed inside a thin, square-shaped container, hereinafter referred to as a jewel box 18. The disk body 12 itself is of conventional construction made of polycarbonate or another acceptable plastic and has a uniform thickness, a top surface 20, a bottom surface 21, and a centrally located cutout 22, bound by a circular peripheral edge 23. A recording medium in the form of a thin, silver oxide coating (not shown) is uniformly applied to the top surface 20 of the disk body 12. A clear resin ultraviolet protective coating (not shown) is applied over the top surface 20 and the silver oxide coating during manufacturing.

The center plug 14 is preferably cylindrical in shape and has a thickness equal to or slightly greater than the thickness of the disk body 12 for reasons to be discussed in greater detail below. It is slightly smaller in diameter than cutout 22 so as to provide a snap-fit connection with the peripheral edge 23 to securely hold the center plug 14 within the cutout 22. The center plug 14 is preferably formed of polycarbonate, which may be optically clear, translucent or opaque, but other suitable plastics or other materials may be substituted.

In the embodiment shown in FIGS. 1–3, an EAS tag 30 is attached to the top surface 15 of the center plug 14. In the preferred embodiment, the EAS tag 30 is an adhesive backed, EM-type or RF-type EAS tag. EM-type EAS tags are particularly useful in the retail industry because they may be repeatedly turned on and off (called recyclable) with an activator and deactivator, respectively. EM-type EAS tags typically include a plurality of soft iron slugs that are longitudinally aligned over an adhesive paper substrate to produce a magnetic "signature" read by two detectors (also called antenna). Such tags are available from Knogo, Inc. and Minnesota, Manufacturing, and Mining, Inc. (3M) and are incorporated by reference. It should be understood that other types of HAS tags may also be used within the system. In every system, the size and shape of the EAS tag 30 must be sufficient to entirely fit within the top surface 15 of the center plug 14 so that the center plug 14 may be easily removed from the center cutout 22.

In FIG. 2, an optional main label 50 is adhesively attached over the entire top surface 20 of the disk body 12. The center portion of the main label 50 extends across the center plug 14. As shown in FIG. 3, a circular shaped perforated line 60 is formed on the main label 50 thereby dividing it into a central portion 52 having the same shape and size as the center plug 14 and an outer portion that covers most if not all of the top surface 20 of the disk body 12. Printed on the top surface 20 of the main label 50 are advertisements and other useful indicia, generally referenced as 55.

In FIG. 5, a third embodiment of the invention is shown comprising an adhesive-back EAS tag 30 is shown attached to the bottom surface 16 of the center plug 14.

During manufacturing, the EAS tag 30 may be attached or manufactured inside the center plug 14. The center plug 14 is then inserted either manually or by machine into the cutout 22 so that the bottom surface 42 of the center plug 14 is substantially flush or coplanar with the bottom surface 21 of the disk body 12. Next, the main label 50 is concentrically positioned over the disk body 12 and center plug 14.

The optical recordable disk assembly 10 is packaged for sale in the assembled position as described above in the jewel box 1 8 without having a center plug 14. In such a jewel box 18, the disk body 12 is retained therein merely by frictional engagement with the outer periphery of the disk body 12 to mating portions 19 of the jewel box 18.

Should it become necessary for the user to remove the center plug 14, he or she may simply do so by holding the outer periphery of the disk body 12 with the fingers of one hand, grasping the center plug 14 between the-thumb and forefinger of the other hand and applying a slight pressure in an upward direction. Such pressure will cause the label 50 and central portion of the label 52 on opposite sides of the perforated line 60 to part and allow the center plug 14 to be removed. After the disk body 12 is used, the center plug 14 is inserted back into the cutout 22. The continuity of the printed material on the main label 50 may be re-established by simply aligning or registering the printed indicia 55 on the center portion 52 of the main label 50 with the outer portions of the main label 50 (see star image in the center of disk 12 in FIG. 2). The center plug 14 can be removed and replaced repeatedly in the disk body 12.

As discussed in the inventors' earlier-filed U.S. patent application, (see above), one advantage of this invention is that it permits the user to maintain the optical recordable disk in its original condition with an unbroken label, thus enhancing its value.

Another advantage of this invention is that it provides a means for verifying that the optical recordable disk 12 is in an unused condition since use would necessitate removal of the center plug 14. Use would be obvious from a cursory examination of the perforated line 60 on the main label 50. Detection of use could not be avoided by removal of the entire main label 50 from the optical recordable disk assembly 10 because due to the aggressiveness of the adhesive, such removal would result in simultaneous removal of portions of the underlying recording medium.

In compliance with the statute, the invention described herein has been described in language more or less specific as to structural features. It should be understood, however, that the invention is not limited to the specific features shown, since tile means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. An optical recordable disk security system, comprising:
   a. a disk body including a cutout for use on a spindle in a player, said disk body having a top surface;
   b. a plug removably insertable in said cutout, said plug having top and bottom surfaces;
   c. an electronic article surveillance tag connected to said plug, the presence or absence of which is detectable by a suitable electronic surveillance detector; and,
   d. a label attached over said top surface of said plug to hide said electronic article surveillance tag.

2. The system of claim 1, wherein said label fully extends over and adhesively attaches to said top surface of said disk body, said label including a circular perforated line aligned and registered over said cutout.

3. The optical recordable disk security system of claim 1, wherein said electronic article surveillance tag is adhesively attached to said plug.

4. The optical recordable disk security system of claim 1, wherein said electronic article surveillance tag is a RF-type tag.

5. The optical recordable disk security system of claim 1, wherein said electronic article surveillance tag is an electro-magnetic-type tag.

6. The optical recordable disk security system of claim 1, wherein said electronic article surveillance tag is attached using a suitable adhesive.

7. An optical recordable disk security system, comprising:
   a. a disk body including a cutout for use on a spindle in a player, said disk body having a top surface;
   b. a plug removably insertable in said cutout, said plug having top and bottom surfaces;
   c. an electronic article surveillance tag disposed inside said plug, whereby the presence or absence of said electronic surveillance tag is detectable by a suitable electronic surveillance detector; and,
   d. a label attached over said top surface of said plug to hide said electronic article surveillance tag.

8. An optical recordable disk security system, comprising:
   a. a disk body including a cutout for use on a spindle in a player, said disk body having a lop surface;
   b. a plug removably insertable in said cutout, said plug having top and bottom surfaces;
   c. an electronic article surveillance tag attached to said bottom surface of said plug, the presence or absence of which is detectable by a suitable electronic surveillance detector; and,
   d. a label attached over said top surface of said plug to hide said electronic article surveillance tag.

* * * * *

UNITED STATES PATENT AND TRADEMARK OFFICE
CERTIFICATE OF CORRECTION

PATENT NO. : 6,614,750 B2  Page 1 of 1
DATED : September 2, 2003
INVENTOR(S) : Warren Weber and Kevin S. Davis It is certified that error appears in the above-identified patent and that said Letters Patent is hereby corrected as shown below:

<u>Column 2,</u>
Line 20, replace "maybe" with -- may be --.
Lines 33 and 41, replace "HAS" with -- EAS --.
Line 62, replace "art-removable" with -- a removable --.

<u>Column 3,</u>
Line 16, replace "maybe" with -- may be --.
Line 61, replace "HAS" with -- EAS --.

<u>Column 6,</u>
Line 16, replace "lop" with -- top --.

Signed and Sealed this

Twenty-seventh Day of January, 2004

JON W. DUDAS
*Acting Director of the United States Patent and Trademark Office*